Sept. 22, 1931.     R. C. PIERCE     1,824,568
METHOD OF TREATING WIRE
Filed Oct. 25, 1929
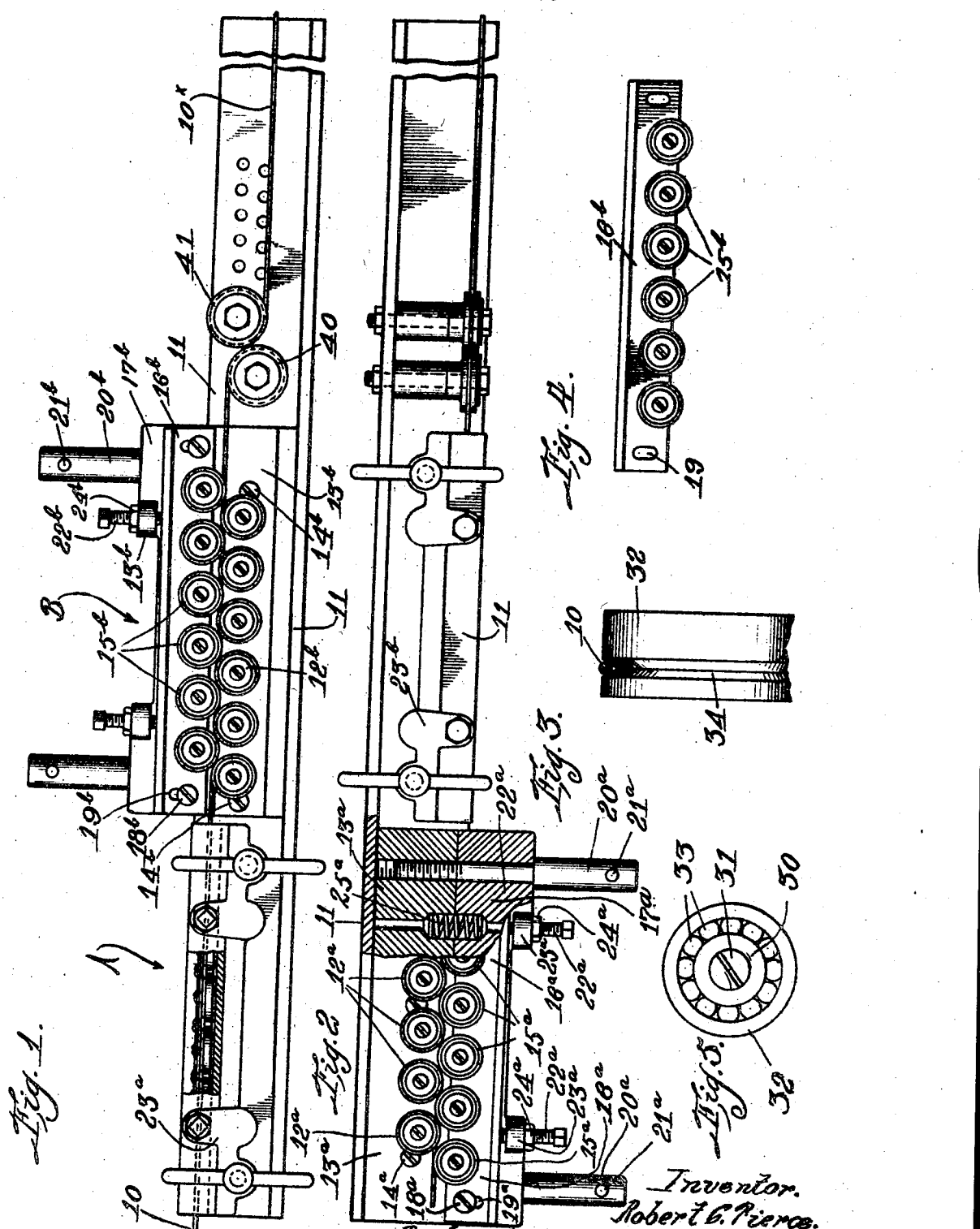

Patented Sept. 22, 1931

1,824,568

UNITED STATES PATENT OFFICE

ROBERT C. PIERCE, OF NILES, MICHIGAN, ASSIGNOR TO NATIONAL-STANDARD COMPANY, OF NILES, MICHIGAN, A CORPORATION OF MICHIGAN

METHOD OF TREATING WIRE

Application filed October 25, 1929. Serial No. 402,521.

This invention relates to improvements in method of treating wire. In certain cases, for example, in the manufacture of reinforcing elements for tire beads, it is desirable to increase the elongating or stretching property of the wires used as tension members in such reinforcements.

One of the features of my invention, therefore, is to provide a method for so increasing this property or characteristic of wire so that wire, after being thus treated, will stretch or elongate under strain to a greater extent than before treatment. This increasing of the stretchability or elongating property of wire is sometimes referred to in the arts as increasing the "elongation" of wire.

My improved method of treating wire also operates to straighten the wire by taking out the kinks and bends. In the manufacture of woven and braided reinforcing elements for tire beads, it is frequently desirable to so straighten the wire before forming the element.

In the practice of my invention, therefore, it is possible to increase the stretchability of wire and straighten it in one operation.

There are also other features of my invention that will be pointed out more in detail hereinafter.

In that form of device shown in the accompanying drawings for practicing the new method of treating wire—

Figure 1 is a view in side elevation; Fig. 2 is a top plan view; Fig. 3 is a detail view of a part of one of the rollers; Fig. 4 is a view in side elevation of one of the adjustable roller carrying blocks showing the same removed from the apparatus; and Fig. 5 is a view in side elevation of one of the rollers showing the same removed from the apparatus.

As shown in the drawings, 10 indicates the wire entering the apparatus and 10$^x$ shows the same leaving after treatment. It is to be understood that any suitable feeding means (not shown) may be employed for drawing the wire through the apparatus.

The apparatus includes a suitable elongated supporting member or angle iron 11 which carries two sets of rollers designed to give the wire first a series of alternate opposite bends in one plane and then in another plane substantially at right angles to the first. The bands given by each set of rollers decrease progressively in magnitude. Each set of rollers includes two rows, the rollers in one row being staggered with respect to those in the other.

Since the construction and operation of the two sets of rollers and the apparatus for supporting the same are substantially the same, I shall describe but one in detail. It is to be understood, however, that one set of rollers operates on the wire in one plane and the other set in a plane substantially at right angles to the first. The entire set of rollers and support therefor operating in the horizontal plane may be indicated in general by A and the other set by B.

The rollers in each set, for example, those in set A, include two rows. The rollers in one row are indicated by 12$^a$, 12$^a$. These rollers are mounted on a block 13$^a$ attached to the angle iron 11 in any suitable manner, for example, by the screws 14$^a$. The adjacent row of rollers, as indicated by 15$^a$, 15$^a$, are staggered with respect to the others and carried by a bar 16$^a$ adjustably mounted on the block 17$^a$ by means of the machine screws 18$^a$ extending through the slots 19$^a$. By loosening the screws 18$^a$, the ends of the bar 16$^a$ may be independently shifted and then the bar may be secured firmly in its adjusted position by tightening the screws 18$^a$.

To permit easy insertion of a new wire and to permit inspection, cleaning, repair, and the like, it sometimes is desirable to separate the two rows of rollers. This may be easily accomplished without disturbing the adjustment in the following manner. The block 17$^a$ is fastened to the block 13$^a$ by the two screws 20$^a$, 20$^a$ provided with the cross handles 21$^a$, 21$^a$. If it is desired to separate the two rows of rollers, the entire block 17$^a$ may be readily removed. This may then be put back against the block 13$^a$ without altering the mounting of the bar 16$^a$. It will be seen, therefore, that after the two rows are once adjusted, this adjustment can always again be quicky established by merely fastening together the two blocks 13$^a$ and 17$^a$.

I have found that it usually is desirable to adjust the two rows of rollers 12ª and 15ª so that the bends given to the wire as it passes between the same will decrease progressively in magnitude. That is, the rollers at the end where the wire enters are somewhat closer together than at the other end. The exact setting of the rollers and the amount of bend given to the wire will depend, to some extent, upon the size and kind of wire being treated; and may best be determined by experimentation.

Numerals 22ª, 22ª indicate screws extending through ears or lugs 23ª, 23ª on the block 17ª. These screws will assist in adjusting the bar 16ª as they may be used to force either end of such bar toward the wire and will then assist in holding the bar in place. These screws are provided with lock nuts 24ª.

Numerals 25ª, 25ª indicate springs operating to urge the blocks 13ª and 17ª apart when the holding screws 20ª, 20ª are released.

The apparatus indicated by B is similar to that indicated by A and similar parts bear similar reference numerals with the exponents "b" instead of "a". The bar 16ᵇ with the rollers 15ᵇ is shown removed in Fig. 4.

All the rollers are substantially the same in construction. Each of these includes a central supporting ring 30 (see Fig. 5) attached to its supporting bar by a screw 31 and an outer rotatable ring 32 mounted on the inner ring by the balls 33. A portion of an outer ring is shown on an enlarged scale in Fig. 3. This view also shows clearly the groove 34 in which the wire 10 lies. It is to be particularly noted that the groove is substantially 60° V-shaped in cross-section, thus giving the wire a two point support. With such a construction the wire is firmly held against side play even after the groove wears somewhat. With a round groove, considerable sidewise movement is permitted as soon as the groove becomes enlarged by wear.

As the wire leaves the second set of rollers, it may be passed between two larger guide rollers 40 and 41 which may be similar to the other rollers and mounted on the member 11, but these rollers may be omitted.

While I have shown and described certain embodiments of apparatus for practicing my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In the manufacture of a reinforcing element for a tire bead, the method of treating wire to be used as a tension member in said reinforcement to increase the stretchability of said wire, consisting of subjecting said wire to a series of alternate opposite bends until the desired degree of stretchability is obtained.

2. The method of treating wire as claimed in claim 1 in which the wire is subjected to a series of alternate opposite bends progressively decreasing in magnitude.

3. The method of treating wire as claimed in claim 1 in which the wire is subjected to a series of alternate opposite bends, first in one plane and then in a plane substantially at right angles to the first.

4. The method of treating wire as claimed in claim 1 in which the wire is subjected to a series of alternate opposite bends progressively decreasing in magnitude, first in one plane and then in a plane substantially at right angles to the first.

In witness whereof, I have hereunto set my hand this 22nd day of October, 1929.

ROBERT C. PIERCE.